United States Patent

Putnam et al.

Patent Number: 5,528,367
Date of Patent: Jun. 18, 1996

[54] IN-LINE FIBER ETALON STRAIN SENSOR

[75] Inventors: Marty Putnam, Alexandria, Va.; Jim Sirkis, Burtonsville, Md.; Timothy A. Berkoff, Alexandria; Alan D. Kersey, Fair Fax Station, both of Va.; Edward J. Friebele, Cheverly, Md.

[73] Assignee: The United States of America as represented by the Secretary of the Navy, Washington, D.C.

[21] Appl. No.: 302,013

[22] Filed: Sep. 9, 1994

[51] Int. Cl.⁶ ...................................... G01B 9/02
[52] U.S. Cl. ............................ 356/345; 356/352
[58] Field of Search ............................ 356/345, 352; 385/12, 14

[56] References Cited

U.S. PATENT DOCUMENTS

| | | | |
|---|---|---|---|
| 4,815,855 | 3/1989 | Dixon | 356/358 |
| 4,830,451 | 5/1989 | Stone | 350/96.15 |
| 5,301,001 | 4/1994 | Murphy et al. | 356/35.5 |

OTHER PUBLICATIONS

J. Sirkis et al., "Development of a Structurally Embedded In–Line Fiber Etalon for Internal Strain Measurement", presented at the *SPIE Proceedings on Fiber Optic Physical Sensors in Manufacturing and Transportation*, Boston, Mass., 2 cover pages and pp. 262–271, (8–10 Sep. 1993).

*Primary Examiner*—Frank Gonzalez
*Assistant Examiner*—Robert Kim
*Attorney, Agent, or Firm*—Thomas E. McDonnell; George Jameson

[57] ABSTRACT

An in-line fiber etalon strain sensor, and method for making the sensor, is disclosed. The in-line fiber etalon strain sensor uses a short segment of silica hollow-core fiber spliced between two cleaved sections of single-mode fiber to form a mechanically robust in-line cavity. In making the sensor, a portion of a protective coating is removed from one end of each of the two cleaved sections of the single-mode fiber to form a bare portion adjacent to a partially reflective end face on each fiber section. The silica hollow core fiber is fabricated to have the same outside diameter as each of the bare portions of the fiber sections. One end of the silica hollow core fiber is then fusion spliced in-line with the partially reflective end face of one of the fiber sections, before the other end of the silica core fiber is fusion spliced in line with the partially reflective end face of the other fiber section to form a cavity within the silica hollow core fiber that is bounded by the two partially reflective end faces. Operation of the in-line fiber etalon is based on interference between the Fresnel reflections from the two glass/air interfaces formed by the cleaved surfaces of the single mode fibers at each end of the hollow core fiber. Strain induced changes result in a concomitant change between the two optical paths. The phase changes can then be demodulated and related to the input strain stimuli.

11 Claims, 4 Drawing Sheets

FIBER ENDS MUST BE FLAT ic patent

IN-LINE FIBER ETALON STRAIN SENSOR

BACKGROUND OF THE INVENTION

1. Field of the Invention

The present invention relates to strain sensors and particularly to an in-line fiber etalon strain sensor and method for making such in-line fiber etalon strain sensor.

2. Description of the Related Art

A variety of fiber-optic sensors for "smart" materials and structures applications have been proposed for monitoring the thermomechanical state of load bearing structural materials. Fabry-Perot (FP) type sensors have been extensively studied, including the extrinsic Fabry-Perot interferometer (EFPI) sensor (shown in FIG. 1), in which an air gap between two cleaved fiber end faces serves as the cavity, and the intrinsic Fabry-Perot interferometer (IFPI) sensor (shown in FIG. 2), which utilizes semi reflective or partially reflective surfaces on the end faces of a fiber "spacer" serving as the FP cavity.

The EFPI sensor of FIG. 1 is fabricated by inserting two cleaved single mode fibers 11 and 13 into a small diameter hollow tube or sleeve 15 for mechanical stability, and then bonding them in place by applying epoxy adhesive 17 to the edges 16 of the tube 15. The cavity 18 is defined by the space between the end-faces 19 and 21 of the respective fibers 11 and 13. Reflections R1 and R2 from the end-faces 19 and 21 produce an interference pattern which is proportional to the strain applied to the cavity 18.

The IFPI sensor of FIG. 2 is fabricated by coating both end faces of a section of single mode fiber 23 with a reflective layer or film to form reflective interfaces 25 and 27. Then the fiber 23 is fusion spliced at the reflective interface 25 end to a long single mode fiber 29. The section of single mode fiber 23 with the reflective interfaces 25 and 27 forms the cavity for the IFPI sensor of FIG. 2. Another long single mode fiber 31 may be fusion spliced to the other end of the single mode fiber 23 which contains the reflective interface 27. The reflective interfaces 25 and 27 thus become part of in-fiber reflective splices. One or more additional IFPI sensors may be added to the sensor system of FIG. 2 in the same manner as described above.

Both of the IFPI and EFPI sensor configurations have shown promise for structurally-embedded applications due to their ease of fabrication, lead-insensitivity, and high strain resolution. In addition, the EFPI is insensitive to transverse strains and has low thermal apparent strains. However, both the EFPI and IFPI sensors have at least two disadvantages that may limit their utility. First, their mechanical strength is significantly less than that of a typical optical fiber. Sensor strength is an important issue for embedded applications where the fabrication process of the structural member can lead to catastrophic failure of the fiber. Since embedded sensors are not easily repaired or replaced, refabrication of the component part is usually required.

In the case of the EFPI, there are stress concentrations due to diameter discontinuities between the lead-in fibers and the oversleeved alignment tube. Although the IFPI sensor is relatively immune to stress concentrations due to its continuous diameter, the degraded strength of partially reflecting splices may lead to early mechanical failure. A second concern for the EFPI is that the gage length is determined not by the air gap between the fibers but by the separation of the attachment edges 16 to the oversleeve tube. The epoxy used as a sealer wicks into the space between the tube and the fibers, so that the gage length for each sensor must be individually calibrated. Furthermore, microcracking of the epoxy from repeated cyclical loading will cause the gage length to change with time.

Nevertheless, the EFPI holds several advantages over the IFPI. The thermal optic coefficient of the IFPI sensor leads to significant ambiguity (thermal apparent strain) when strain measurements are made in thermo-mechanical loading environments, while the transverse strain insensitivity and low thermal apparent strain of the EFPI are particularly important for fiber optic "smart structure" applications where the sensor is commonly embedded within load-bearing structural components.

SUMMARY OF THE INVENTION

Accordingly, it is an object of this invention to provide an in-line fiber etalon strain sensor and method for making such in-line fiber etalon strain sensor.

Another object of the invention is to provide an improved strain sensor that can be embedded in the construction of satellites, bridges, airplane wings and in any other smart materials and structures applications where knowing strain information is important.

Another object of the invention is to provide an in-line, hollow-core strain sensor which has a continuous low profile, high strength, low thermal apparent strain, a short gauge length, a well-defined gauge length, is easy to fabricate and is highly sensitive to axial strain.

Another object of the invention is to provide an in-line fiber etalon strain sensor comprised of a single mode lead-in fiber, a short piece of hollow core fiber typically between 20 and 200 microns long, and a single mode lead out fiber.

A further object of the invention is to provide an optical fiber strain sensor that uses a short segment of silica hollow-core fiber spliced between two sections of single-mode fiber to form a mechanically robust in-line cavity.

These and other objects of this invention are achieved by providing an in-line fiber etalon strain sensor, and method for making such sensor. The in-line fiber etalon strain sensor uses a short segment of silica hollow core fiber spliced between two cleaved sections of single-mode fiber to form a mechanically robust in-line cavity. Typically, the hollow core fiber is initially a bare fiber, without a protective coating around it. In making the sensor, a portion of a protective coating is initially removed from one end of each of the two cleaved sections of the single-mode fiber to form a bare portion adjacent to a partially reflective end face on each fiber section. The silica hollow core fiber is fabricated to have the same outside diameter as each of the bare portions of the fiber sections. One end of the silica hollow core fiber is then fusion spliced in-line with the partially reflective end face of one of the fiber sections, before the other end of the silica hollow core fiber is fusion spliced in line with the partially reflective end face of the other fiber section to form a cavity within the silica hollow core fiber that is bounded by the two partially reflective end faces. After the in-line fiber etalon strain sensor is assembled, the bare portions of each of the fiber sections, as well as the hollow core fiber, may be coated with a protective coating to provide additional strength and protection for the in-line fiber etalon strain sensor. Operation of the in-line fiber etalon strain sensor is based on interference between the Fresnel reflections from the two glass/air interfaces formed by the cleaved surfaces of the single mode fibers at each end of the hollow core fiber. Strain induced changes result in a concomitant change between the two optical paths. The phase changes can then be demodulated and related to the input strain stimuli.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding part throughout the several views, and wherein.

DESCRIPTION OF THE INVENTION

Figure 1:
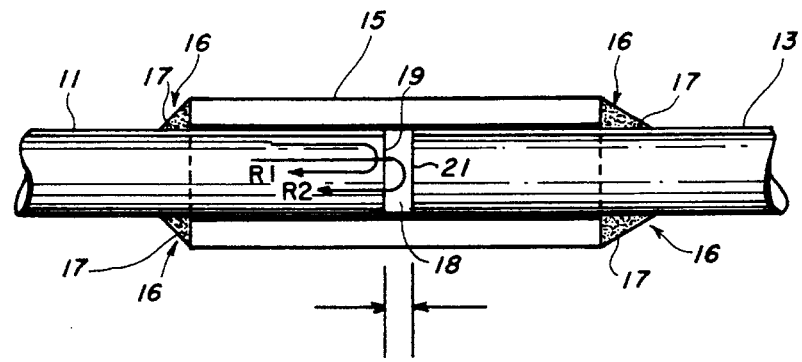
FIG. 1 is a general diagram of a prior art extrinsic Fabry-Perot interferometer sensor.
Figure 2:
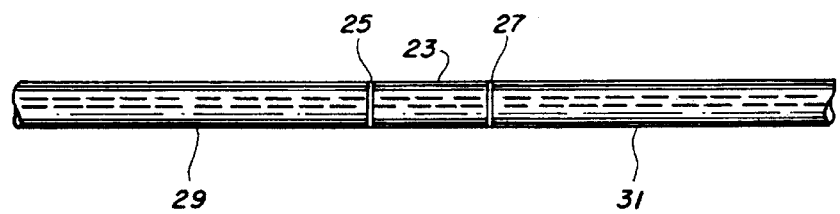
FIG. 2 is a general diagram of a prior art intrinsic Fabry-Perot interferometer sensor.
Figure 3:
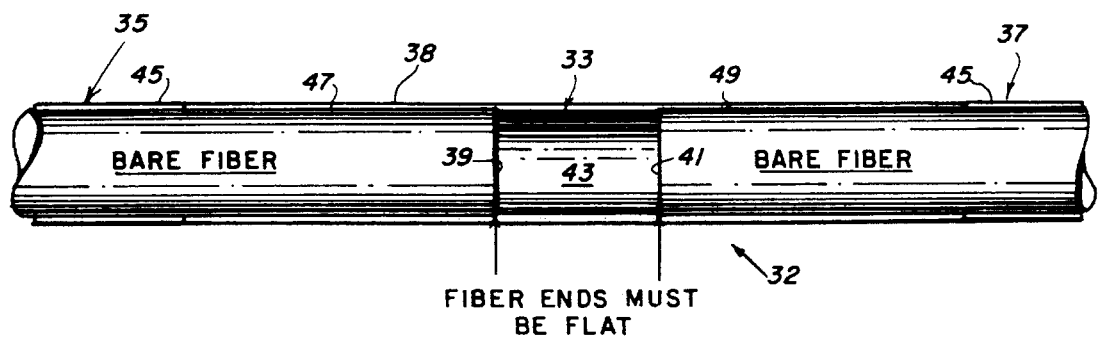
FIG. 3 is a diagram of the in-line fiber etalon strain sensor of the present invention.

Referring now to FIG. 3, a preferred embodiment of the in-line fiber etalon (ILFE) strain sensor 32 of the invention is shown. Basically, the ILFE sensor 32 is formed by fusing a short section of hollow core fiber 33 between two standard single mode lead-in/lead-out fibers 35 and 37 to form a mechanically robust in-line cavity. Typically, the hollow core fiber 33 is initially a bare fiber, without a protective coating around it. The hollow core fiber 33 is specifically manufactured to have an outer diameter that is equal to the outer diameter of a bare end portion of each of the single mode lead fibers 35 and 37, thereby combining the best qualities of existing intrinsic and extrinsic Fabry-Perot sensors.

After the ILFE strain sensor 32 is assembled, the bare portions of each of the single mode fibers 35 and 37, as well as the hollow core fiber 33, may be coated with a protective coating 38 similar to the protective coating 45 (to be discussed) to provide additional strength and protection for the in-line fiber etalon strain sensor 32.

The ILFE sensor 32 is based on interference between the Fresnel reflections from a glass/air interface 39 and an air/glass interface 41 which, in combination form a low finesse etalon having an ILFE cavity 43. Strain induced changes in the air gap separation results in an optical intensity having a cosinusoidal dependence, $I=A(1+V\cos\Phi)$, on strain, where $A$ and $V$ are the usual constants governing amplitude and visibility, and $\Phi$ is the interferometer phase term. Higher order reflections can be neglected due to beam divergence in the cavity and the low reflectivity of the air/glass surfaces.

Figure 4A:
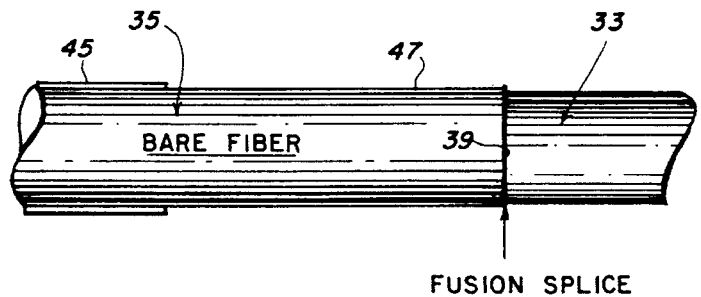
FIGS. 4A–4C illustrate the steps involved in the fabrication of the in-line fiber etalon strain sensor of the present invention.
Figure 4B:
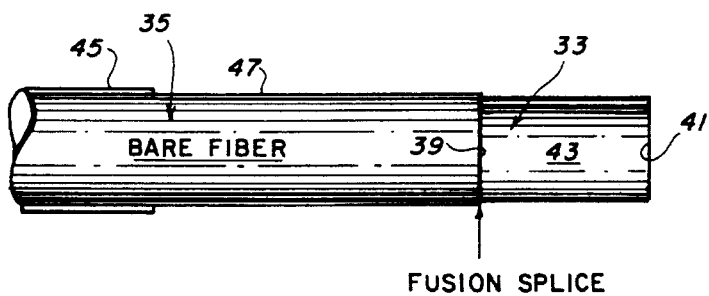
Figure 4C:
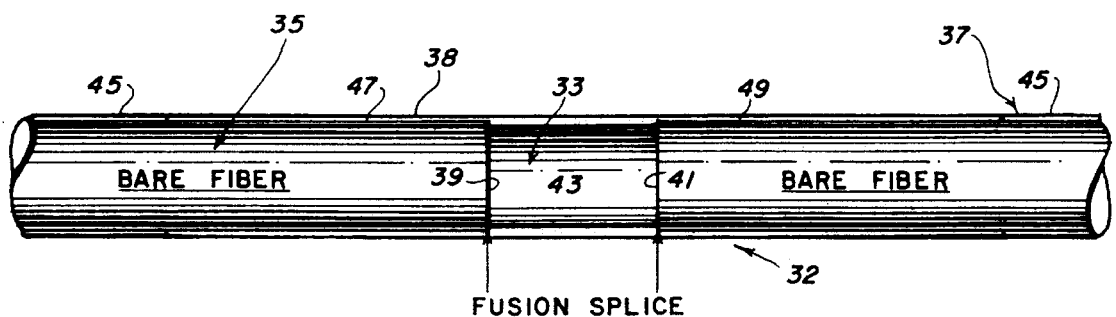

Referring to FIGS. 4A–4C, the fabrication of the ILFE strain sensor 32 of FIG. 3 will now be explained in detail. However, it should be noted at this time that each of the single mode fibers 35 and 37 (shown in FIGS. 3, 4A, 4B and 4C) is surrounded by a coating 45 which is typically made of a plastic material to protect the glass single mode fiber from deteriation or damage from atmospheric elements and environmental conditions. This coating 45 is removed from end portions 47 and 49 of the respective fibers 35 and 37 in order to expose bare fiber suitable for fusion splicing the bare fiber portions to the hollow core fiber 33.

As shown in FIG. 4A, the ILFE strain sensor 35 is fabricated by initially utilizing a fusion splicer (not shown) to fuse the bare fiber end portion 47 of a section of the single mode fiber (lead-in) 35 to a silica hollow core fiber 33 which has an outside diameter (OD) equal to that of the bare fiber end portion 47 of the lead-in single mode fiber 35 and an inside diameter (ID) of about 70 μm. Typically, the hollow core fiber 33 is initially a bare fiber, without a protective coating around it. The hollow core fiber 33 was previously fabricated by drawing a 3 mm ID×5 mm OD silica tubing down to the appropriate dimensions.

As indicated in FIG. 4B, the hollow core fiber 33 is next cleaved under a microscope (not shown) to the desired gage length, which typically is selected to be within the 20 μm–200 μm range.

As shown in FIG. 4C, the bare fiber end portion 49 of a second section of single mode fiber (lead-out) 37 is then fused to the cleaved end of the hollow core fiber 33, thus forming the ILFE strain sensor 32 of FIG. 3. Particular care is taken to adjust the fusion splicer settings to attain a complete fuse while minimizing the deformation of the end faces of the single mode fibers 35 and 37. After the ILFE strain sensor 32 is assembled, the bare portions of each of the single mode fibers 35 and 37, as well as the hollow core fiber 33, may be coated with a protective coating 38 similar to the protective coating 45 (FIG. 3) to provide additional strength and protection for the in-line fiber etalon strain sensor 32.

Figure 5:
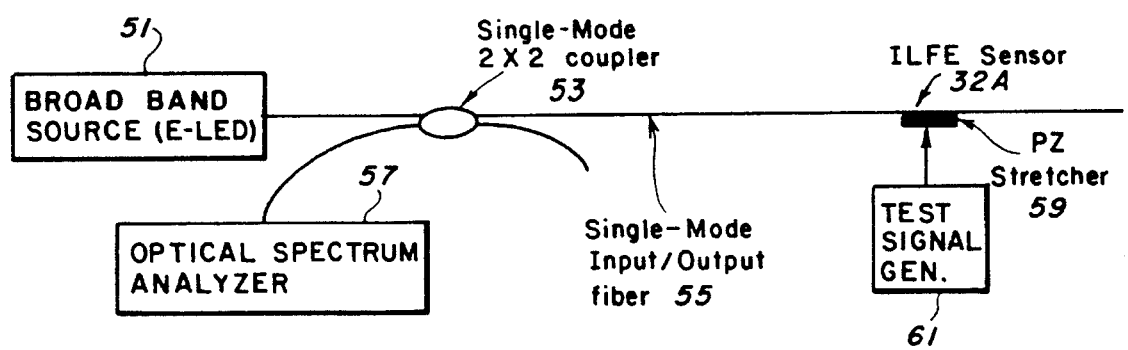
FIG. 5 is a schematic block diagram of the experimental configuration used to examine the performance of the in-line fiber etalon strain sensor of the present invention.

The performance of the ILFE strain sensor 32 of FIG. 3 was evaluated using 'white light' interferometry, as shown by the experimental arrangement in FIG. 5. First, broadband light (FWHM ~50 nm) from a pigtailed edge-emitting light emitting diode (E-LED) source 51 at 1.3 μm was transmitted by way of a single-mode 2X2 coupler 53 through a single-mode input/output fiber 55 into a ~137 μm gauge length ILFE sensor 32A. The light entering the ILFE sensor 32A is then modulated in the sensor 32A by the stress of whatever external strain is being applied to the sensor 32A. To demonstrate fiber strain measurements in the laboratory experimental configuration of FIG. 5, the ILFE sensor 32A was attached to a piezoelectric (PZ) transducer or PZ stretcher 59 to which test strains could be induced by applying a voltage from a test signal generator 61. However, the PZ stretcher 59 and the test signal generator 61 typically would not be part of a normal, non-laboratory operation.

The light that entered the ILFE sensor 32A is then reflected back from the reflective interfaces 39 and 41 and sequentially passed through the input/output fiber 55 and the 2X2 coupler 53. A portion of the reflected ILFE signal is coupled out of one of the ports of the 2X2 coupler 53 to an optical spectrum analyzer 57, which is well known in the art.

With this arrangement, the optical spectrum analyzer 57 can develop an output signal corresponding to the optical path difference between the light from the two reflective etalon surfaces 39 and 41. This output signal can discriminate intensity and visibility variations, and a quasi-linear response to strain can be obtained without having to actively adjust the ILFE sensor 32A to obtain quadrature phase bias (nπ+π/2 radians).

Figure 6:
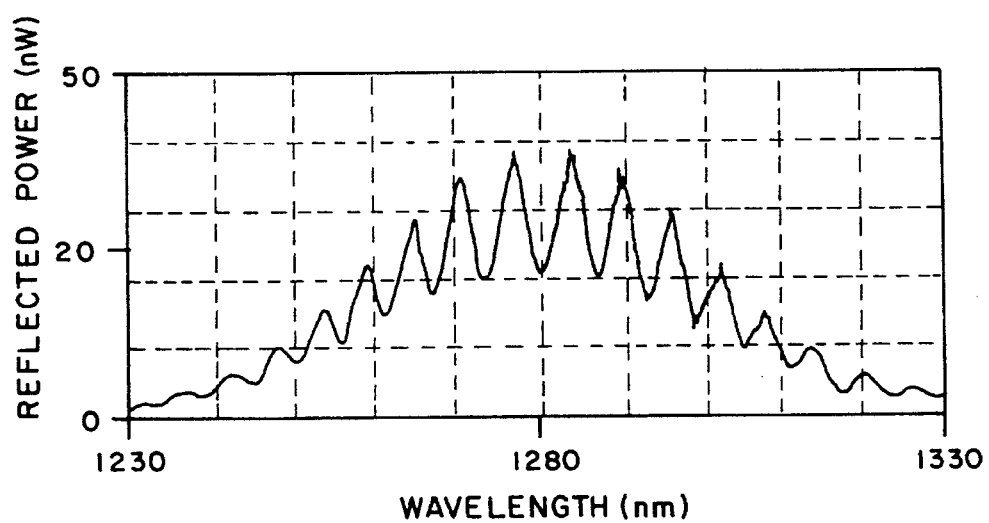
FIG. 6 illustrates the frequency response of the in-line fiber etalon strain sensor of the present invention in the experimental configuration of FIG. 5.

FIG. 6 shows the frequency response of the ILFE sensor 32 of the invention in the experimental configuration of FIG. 5. More specifically, FIG. 6 shows the spectrum analyzer scan from 1230 to 1330 nm that was obtained. As can be seen, the spectrum of light from the broad band source 51 is modulated at a frequency that corresponds to the free spectral range of a 137 μm etalon spacing and has an effective fringe visibility of ~0.3. By adjusting the nominal wavelength of the spectrum analyzer 57 in the non-scanning mode, a quasi-linear sensor response was obtained by choosing an operational wavelength that corresponds to quadrature phase bias (nπ+π/2 radians) of the ILFE sensor phase term $\phi$.

Figure 7A:
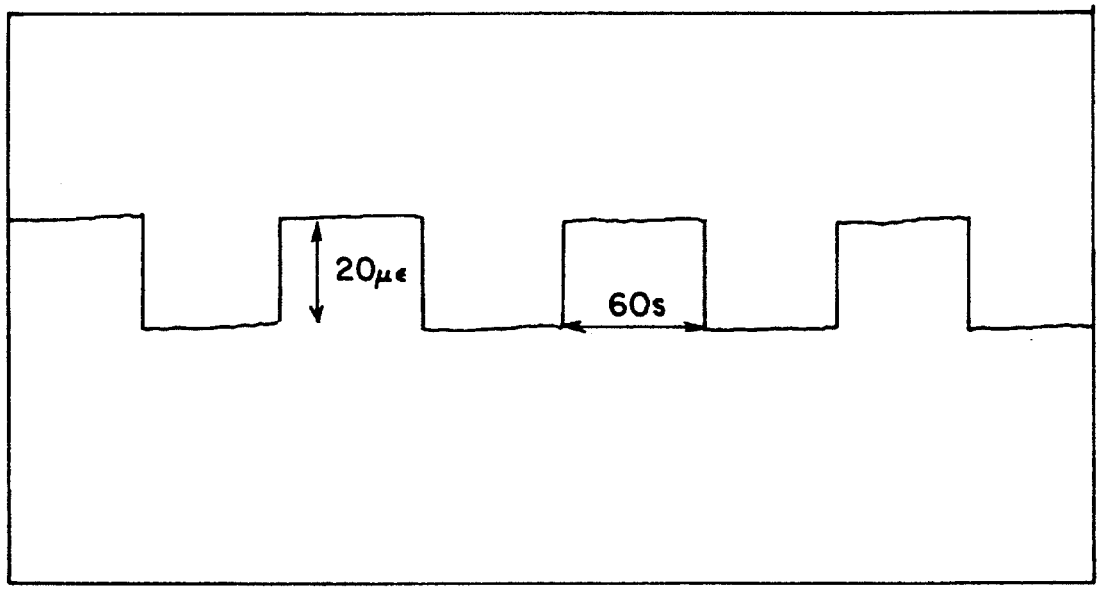
FIG. 7A shows the optical spectrum analyzer (FIG. 5) analog output for several 20 microstrain (με) steps over 60 second time intervals.

FIG. 7A shows the analog output signal of the optical spectrum analyzer 57 for several 20 με steps over 60 second time intervals. In addition to DC-type step changes, the performance of the output of the ILFE sensor 32A was also recorded for dynamically varying signals.

Figure 7B:
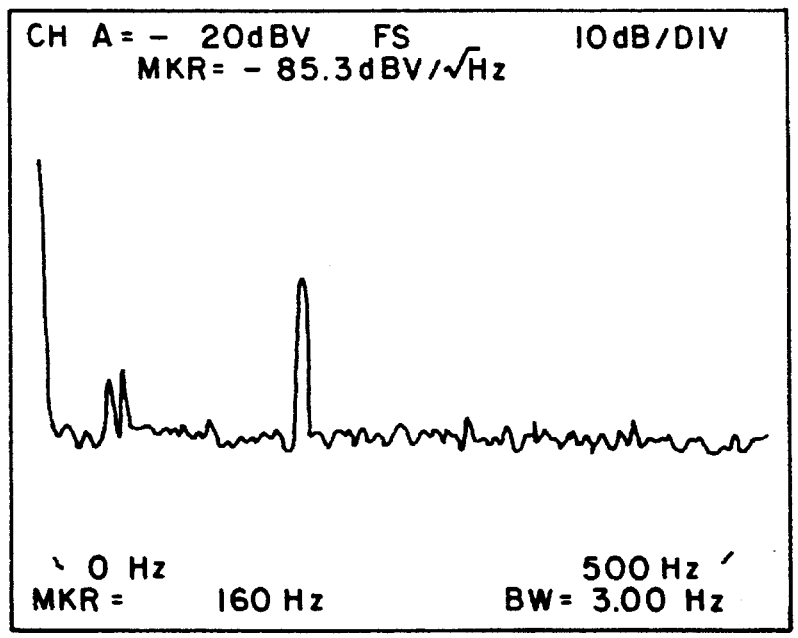
FIG. 7B shows the electronic power spectrum of the photodetector signal when a 180 Hz, 1 mrad rms (1.7 με rms) test signal was applied to the in-line fiber etalon strain sensor by way of the piezo-electric element (FIG. 5).

FIG. 7B shows the electronic power spectrum of the same analog output signal from the optical spectrum analyzer 57 when a 180 Hz, 1 mrad rms (1.7 με rms) test signal was applied to the ILFE sensor 32A via the PZ stretcher element 59 (FIG. 5). The noise floor from 5 to 500 Hz corresponds to a resolution of ~22 nε applied to the sensing region of the ILFE sensor 32A.

Clearly, the bulk-optic spectrum analyzer is useful for a laboratory test and evaluation of ILFE sensor 32A. However, a more practical field implementation of this ILFE sensor 32A device would be to use a more compact compensating element such as an integrated optic or miniature bulk optic interferometer in place of the optical spectrum analyzer 57 which commonly employs a dispersive element. In this approach, this compensating element would have a path imbalance adjusted to match the ILFE sensor 32A and would allow for the implementation of numerous passive signal processing methods to recover strain information without actively adjusting the bias setting of the sensor.

ADVANTAGES AND NEW FEATURES

The in-line fiber etalon (ILFE) sensor configuration is a hybrid between EFP and IFP configurations. The new in-line hollow-core sensor is short gauge length, low profile, robust, easy to fabricate, and highly sensitive to axial strain with low thermal apparent strain. Equally important is that this sensor can be fabricated with well-defined gauge lengths as small as 50 μm. Strain measurements made utilizing "white-light" interferometric techniques demonstrate that the sensor is capable of ~22 nε resolution for dynamic signals >5 Hz with a 137 μm gauge sensing length.

Therefore, what has been described is a novel in-line fiber etalon strain sensor that is formed by fusing a short section of hollow core fiber between two standard single mode fibers to form a mechanically robust in-line cavity. The hollow-core fiber is specifically manufactured to have an outer diameter that is equal to the outer diameter of a bare end portion of each of the single mode fibers.

It should therefore readily be understood that many modifications and variations of the present invention are possible within the purview of the claimed invention. For example, the detection and demodulation technique involved in the use of an optical spectrum analyzer could be changed to a less expensive and more practical form. Furthermore, microlenses or gradient index lens could be utilized instead of cleaved surfaces to form the ILFE cavity, which would enable the use of increased cavity lengths and would reduce power loss in the ILFE cavity. It is therefore to be understood that, within the scope of the appended claims, the invention may be practiced otherwise than as specifically described.

What is claimed and desired to be secured by Letters Patent of the United States is:

1. An in-line fiber etalon strain sensor comprising:
   first and second single-mode optical fibers, each said single-mode optical fiber having first and second end faces that are partially reflective;
   a protective coating surrounding substantially all of said first and second single-mode optical fibers to form first and second bare portions adjacent to said first and second end faces of said respective first and second optical fibers, each of said first and second bare portions having a preselected outside diameter; and
   a hollow core fiber having an outside diameter substantially equal to the preselected outside diameter of each of said first and second bare portions, said hollow core fiber being affixed between the second end face of said first optical fiber and the first end face of said second optical fiber to form a cavity within said hollow core fiber bounded by said first and second partially reflective end faces.

2. The in-line fiber etalon strain sensor of claim 1 wherein:
   said hollow core fiber is a segment of silica hollow core fiber that is spliced between said first and second single-mode optical fibers.

3. The in-line fiber etalon strain sensor of claim 1 wherein:
   said hollow core fiber is initially cleaved to a desired gage length within a 50–200 micro meter range.

4. The in-line fiber etalon strain sensor of claim 1 wherein:
   each of said partially reflective first and second end faces includes at least one layer of a reflective coating.

5. The in-line fiber etalon strain sensor of claim 1 wherein:
   each of said first and second single-mode optical fibers is comprised of a glass fiber; and
   said hollow core fiber is a segment of silica hollow-core fiber that is fusion spliced at one end thereof to said first bare portion and at a second end thereof to said said second bare portion to form said cavity.

6. The in-line fiber etalon strain sensor of claim 1 further including:
   a second protective coating placed around each of said first and second bare portions and said hollow core fiber to provide strength and protection to said in-line fiber etalon strain sensor.

7. A method for fabricating an in-line fiber etalon strain sensor, said method comprising the steps of:
   selecting first and second sections of a single-mode fiber having first and second partially reflective faces;
   removing a protective coating portion at one end of each of the first and second sections to form a bare portion having a preselected outside diameter in each of the first and second sections;
   fabricating a silica hollow core fiber having the preselected outside diameter and a desired gage length; and
   fusing the hollow core fiber between the first and second partially reflective faces of the first and second sections to form the sensor within a cavity in the silica hollow-core fiber that is bounded by ends of the first and second sections.

8. The method of claim 7 wherein said fabricating step includes the steps of:

drawing a silica hollow core fiber down to the preselected outside diameter; and cleaving the hollow core fiber to the desired gage length.

9. The method of claim 8 wherein said cleaving step includes the step of:

cleaving the hollow core fiber to the desired gage length within a 60–200 micro meter range.

10. The method of claim 7 wherein said selecting step includes the step of:

coating each of the first and second partially relective faces with at least one layer of a reflective coating.

11. The method of claim 7 including after the fusing step the further step of:

placing a second protective coating around each of the first and second bare portions and the hollow core fiber to provide strength and protection to the in-line fiber etalon strain sensor.

* * * * *